US010784510B2

(12) United States Patent
Jeon et al.

(10) Patent No.: US 10,784,510 B2
(45) Date of Patent: Sep. 22, 2020

(54) NEGATIVE ELECTRODE ACTIVE MATERIAL, AND NEGATIVE ELECTRODE AND LITHIUM SECONDARY BATTERY WHICH INCLUDE THE SAME

(71) Applicant: LG Chem, Ltd., Seoul (KR)

(72) Inventors: Hye Lim Jeon, Daejeon (KR); Dong Hun Lee, Daejeon (KR); Sung Bin Park, Daejeon (KR); Wang Mo Jung, Daejeon (KR); Seong Hoon Kang, Daejeon (KR)

(73) Assignee: LG Chem, Ltd. (KR)

( * ) Notice: Subject to any disclaimer, the term of this patent is extended or adjusted under 35 U.S.C. 154(b) by 103 days.

(21) Appl. No.: 15/761,649

(22) PCT Filed: Feb. 3, 2017

(86) PCT No.: PCT/KR2017/001224
§ 371 (c)(1),
(2) Date: Mar. 20, 2018

(87) PCT Pub. No.: WO2017/135758
PCT Pub. Date: Aug. 10, 2017

(65) Prior Publication Data
US 2018/0351171 A1 Dec. 6, 2018

(30) Foreign Application Priority Data

Feb. 5, 2016 (KR) .................. 10-2016-0015029
Feb. 3, 2017 (KR) .................. 10-2017-0015471

(51) Int. Cl.
*H01M 4/485* (2010.01)
*C01G 23/00* (2006.01)
(Continued)

(52) U.S. Cl.
CPC .......... *H01M 4/485* (2013.01); *C01G 23/005* (2013.01); *C01G 23/006* (2013.01); *H01M 4/131* (2013.01);
(Continued)

(58) Field of Classification Search
CPC .............. H01M 4/131; H01M 4/505; H01M 2004/027; H01M 2220/30
See application file for complete search history.

(56) References Cited

U.S. PATENT DOCUMENTS 6,372,384 B1 * 4/2002 Fujimoto ............. C01G 23/005
429/231.1
2003/0017104 A1 * 1/2003 Spitler ................... B82Y 30/00
423/598
(Continued)

FOREIGN PATENT DOCUMENTS

CN 101035743 A 9/2007
CN 100464463 C 2/2009
(Continued)

OTHER PUBLICATIONS

Search report from International Application No. PCT/KR2017/001224, dated May 12, 2017.
(Continued)

*Primary Examiner* — Hoa (Holly) Le
(74) *Attorney, Agent, or Firm* — Lerner, David, Littenberg, Krumholz & Mentlik, LLP

(57) ABSTRACT

The present invention relates to an active material for a lithium secondary battery, which includes a secondary particle formed by agglomeration of primary particles which include a lithium titanium composite oxide represented by Formula 1 or Formula 2, wherein a pore volume is in a range of 0.001 cm$^3$/g to 0.05 cm$^3$/g, and a method of preparing the same, wherein the active material for a lithium secondary (Continued)

battery according to the present invention may maintain an adequate pore volume even during rolling, because strength of the secondary particle is improved by controlling a particle diameter of the primary particle by introducing a metallic element.

15 Claims, 5 Drawing Sheets

(51) Int. Cl.
H01M 4/131 (2010.01)
H01M 10/052 (2010.01)
H01M 10/0525 (2010.01)
H01M 4/02 (2006.01)

(52) U.S. Cl.
CPC ..... *H01M 10/052* (2013.01); *H01M 10/0525* (2013.01); *C01P 2002/54* (2013.01); *C01P 2004/03* (2013.01); *C01P 2004/50* (2013.01); *C01P 2004/51* (2013.01); *C01P 2004/61* (2013.01); *C01P 2004/62* (2013.01); *C01P 2004/64* (2013.01); *C01P 2006/12* (2013.01); *C01P 2006/14* (2013.01); *C01P 2006/40* (2013.01); *H01M 2004/021* (2013.01); *H01M 2004/027* (2013.01)

(56) References Cited

U.S. PATENT DOCUMENTS

| | | | | |
|---|---|---|---|---|
| 2007/0009798 A1* | 1/2007 | Inagaki | ............... | C01G 23/005 429/231.1 |
| 2008/0031798 A1* | 2/2008 | Bourbon | ............... | C01G 23/002 423/331 |
| 2012/0021292 A1 | 1/2012 | Awano et al. | | |
| 2014/0017567 A1 | 1/2014 | Oh et al. | | |
| 2014/0272580 A1* | 9/2014 | Frianeza-Kullburg | ............... | H01M 4/366 429/218.1 |
| 2014/0322609 A1* | 10/2014 | Choi | ............... | C01G 23/005 429/231.1 |
| 2014/0363367 A1 | 12/2014 | Kim | | |

FOREIGN PATENT DOCUMENTS

| | | | |
|---|---|---|---|
| CN | 101764207 A | * | 6/2010 |
| CN | 105594023 A | | 5/2016 |
| JP | 2008511528 A | | 4/2008 |
| JP | 2014524653 A | | 9/2014 |
| KR | 20070047810 A | | 5/2007 |
| KR | 20100136805 A | | 12/2010 |
| KR | 20120076335 A | | 7/2012 |
| KR | 20130116806 A | | 10/2013 |
| KR | 20140009921 A | | 1/2014 |
| KR | 20140142207 A | | 12/2014 |
| KR | 20150128170 A | | 11/2015 |
| WO | WO-2010137582 A1 | * | 12/2010 ........... C01G 23/005 |

OTHER PUBLICATIONS

C. H. Chen et al., "Studies of Mg-Substituted Li4—xMgxTi5O12 Spinel Electrodes (O<=x<=1) for Lithium Batteries", Journal of the Electrochemical Society, Jan. 1, 2001, vol. 148. No. 1, XP055076543.
Extended European Search Report including Written Opinion for Application No. EP17747803.9 dated Jun. 6, 2018.
Li Xing et al., "A novel spherically porous Zr-doped spinel lithium titanate (Li4Ti5—xZrxO12) for high rate lithium ion batte", Journal of Alloys and Compounds. Nov. 21, 2013, vol. 588, pp. 17-24, XP028814923.
Chinese Search Report for Application No. 201780003412.2 dated Jun. 18, 2020, 3 pages.

* cited by examiner

NEGATIVE ELECTRODE ACTIVE MATERIAL, AND NEGATIVE ELECTRODE AND LITHIUM SECONDARY BATTERY WHICH INCLUDE THE SAME

CROSS-REFERENCE TO RELATED APPLICATIONS

This application is a national phase entry under 35 U.S.C. § 371 of International Application No. PCT/KR2017/001224 filed Feb. 3, 2017, which claims priority to Korean Patent Application Nos. 10-2016-0015029, filed on Feb. 5, 2016, and Korean Patent Application No. 10-2017-0015471, filed on Feb. 3, 2017, the disclosures of which are incorporated herein by reference.

TECHNICAL FIELD

The present invention relates to a negative electrode active material which may achieve output improvement and high capacity, and a negative electrode and a lithium secondary battery which include the same.

BACKGROUND ART

Demand for secondary batteries as an energy source has been significantly increased as technology development and demand with respect to mobile devices have increased, and, among these secondary batteries, lithium secondary batteries having high energy density, high operating potential, long cycle life, and low self-discharging rate have been commercialized and widely used.

Also, recently, in line with growing concerns about environmental issues, a significant amount of research into electric vehicles (EVs) and hybrid electric vehicles (HEVs), which may replace vehicles using fossil fuels, such as gasoline vehicle and diesel vehicle, one of major causes of air pollution, has been conducted.

Nickel-metal hydride (Ni-MH) secondary batteries or lithium secondary batteries having high energy density, high discharge voltage, and high output stability have been used as power sources of the electric vehicles (EVs) and hybrid electric vehicles (HEVs), wherein, since the lithium secondary batteries must be used for 10 years or more under harsh conditions, in addition to high energy density and characteristics capable of exhibiting high output in a short period of time, when the lithium secondary batteries are used in the electric vehicles, significantly better stability and long-life characteristics than those of a conventional small lithium secondary battery are inevitably required. Furthermore, excellent rate capability and power characteristics are required for the secondary batteries used in the electric vehicles (EVs) and hybrid electric vehicles (HEVs) depending on the operating conditions of the vehicles.

A lithium titanium composite oxide having high lithium (Li) intercalation and deintercalation potential has recently received attention as an active material of a lithium secondary battery. The lithium titanium composite oxide is advantageous in that fast charge or low-temperature performance is excellent because, in principle, metallic lithium is not precipitated from the lithium titanium composite oxide at the lithium intercalation and deintercalation potential.

Since the lithium titanium composite oxide has been conventionally used as a positive electrode active material and may also be used as a negative electrode active material, its future as the positive electrode and negative electrode active materials is expected and, particularly, since expansion and shrinkage during charge and discharge may be ignored, the lithium titanium composite oxide is an electrode material that attracts attention when the size of the battery is increased. In particular, spinel-type lithium titanate (composition formula $Li_{4+x}Ti_5O_{12}$ ($0 \leq x \leq 3$)) has attracted attention because it has a small change in volume during charge and discharge and excellent reversibility.

The lithium titanium composite oxide is a secondary particle formed by the agglomeration of primary particles, wherein the secondary particle includes pores. However, in a process of coating an electrode with the lithium titanium composite oxide to prepare an active material layer and then rolling the coated electrode, since the pores disappear while the secondary particle collapses, there is a limitation in that charge rate capability is reduced because lithium diffusion is difficult in the active material layer.

Thus, as a result of efforts to develop a technique for addressing the limitation, the present inventors develop a method in which a particle diameter of the primary particle of the lithium titanium composite oxide is controlled by introducing a specific metal into the lithium titanium composite oxide and the strength of the secondary particle is secured therethrough, thereby leading to the completion of the present invention.

DISCLOSURE OF THE INVENTION

Technical Problem

An aspect of the present invention provides a negative electrode active material for a lithium secondary battery, in which an adequate pore volume may be maintained even during rolling, because the strength as well as the pore volume of a secondary particle may be secured by reducing a particle diameter of a primary particle by introducing a metallic element.

Another aspect of the present invention provides a negative electrode for a lithium secondary battery and a lithium secondary battery which include the active material.

Another aspect of the present invention provides a method of preparing the negative electrode active material for a lithium secondary battery.

Technical Solution

According to an aspect of the present invention, there is provided a negative electrode active material for a lithium secondary battery including:

a secondary particle formed by agglomeration of primary particles which include a lithium titanium composite oxide represented by Formula 1 or Formula 2, wherein the secondary particle has a pore volume of 0.001 cm$^3$/g to 0.05 cm$^3$/g:

$$Li_{(4-x)}M_xTi_5O_{12} \qquad [\text{Formula 1}]$$

$$Li_4Ti_{(5-x)}M_xO_{12} \qquad [\text{Formula 2}]$$

wherein, in Formula 1 or Formula 2, $0 < x \leq 0.5$, and

M is sodium (Na), potassium (K), rubidium (Rb), zirconium (Zr), tungsten (W), magnesium (Mg), molybdenum (Mo), or tantalum (Ta).

According to another aspect of the present invention, there are provided a negative electrode for a lithium secondary battery including the negative electrode active material for a lithium secondary battery, and a lithium secondary battery including the negative electrode.

According to another aspect of the present invention, there is provided a method of preparing a negative electrode active material for a lithium secondary battery including steps of:

(1) forming primary particles which includes processes of: (i) solid mixing a lithium-containing compound, a titanium oxide, and a doping metal-containing compound; (ii) dispersing the solid mixture of process (i) in a solvent to prepare a slurry; and (iii) spray drying the slurry prepared in process (ii), wherein step (1) does not include a separate grinding process of the solid mixture and the slurry; and (2) forming a secondary particle by sintering the primary particles formed in step (1), wherein the doping metal includes at least one selected from the group consisting of sodium (Na), potassium (K), rubidium (Rb), zirconium (Zr), tungsten (W), magnesium (Mg), molybdenum (Mo), and tantalum (Ta), and the secondary particle has a pore volume of 0.001 cm$^3$/g to 0.05 cm$^3$/g.

Advantageous Effects

A negative electrode active material for a lithium secondary battery according to the present invention may maintain an adequate pore volume even during rolling, because strength as well as the pore volume of a secondary particle may be secured by reducing a particle diameter of a primary particle by introducing a metallic element. Also, a method of preparing the negative electrode active material for a lithium secondary battery according to the present invention is suitable for the preparation of a negative electrode active material for a lithium secondary battery, because the particle diameter of the primary particle may be controlled by adjusting an amount of the metallic element introduced, and through this, the strength of the secondary particle may be improved and the pore volume during the rolling may be maintained.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
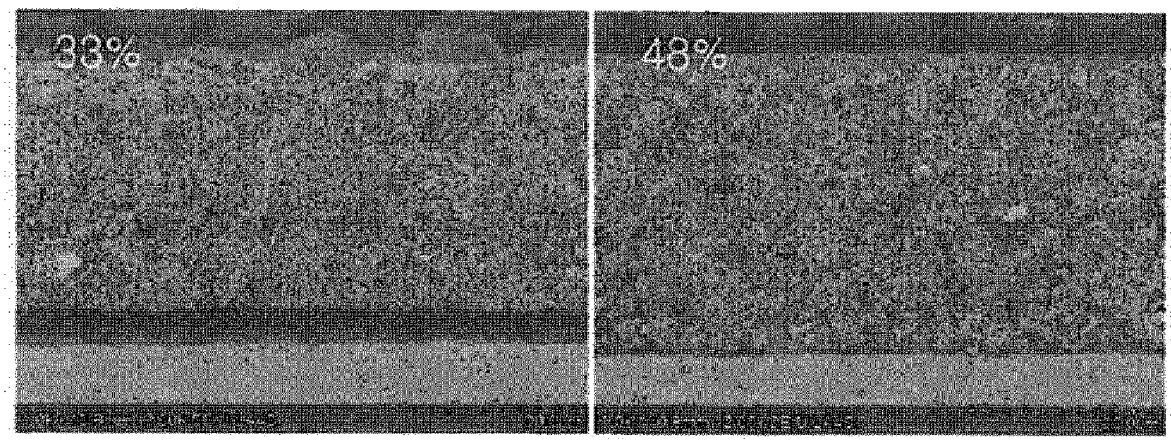
FIG. 1 is scanning electron microscope (SEM) images of negative electrodes for a lithium secondary battery respectively prepared in Examples 4 and 5.

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A negative electrode active material for a lithium secondary battery according to the present invention includes a secondary particle formed by agglomeration of primary particles which include a lithium titanium composite oxide represented by Formula 1 or Formula 2, wherein the secondary particle has a pore volume of 0.001 cm$^3$/g to 0.05 cm$^3$/g.

$$Li_{(4-x)}M_xTi_5O_{12} \quad \text{[Formula 1]}$$

$$Li_4Ti_{(5-x)}M_xO_{12} \quad \text{[Formula 2]}$$

In Formula 1 or Formula 2, $0<x\leq0.5$, and

M is sodium (Na), potassium (K), rubidium (Rb), zirconium (Zr), tungsten (W), magnesium (Mg), molybdenum (Mo), or tantalum (Ta), and may specifically be K, Rb, Mg, or Ta.

The primary particles may have an average particle diameter ($D_{50}$) of 0.05 μm to 2 μm, particularly 0.07 μm to 1 μm, and more particularly 0.1 μm to 0.7 μm.

In a case in which the average particle diameter ($D_{50}$) of the primary particles is 0.05 μm or more, pores formed in the secondary particle in a process of forming the secondary particle by the agglomeration of the primary particles may have an appropriate size, and, in a case in which the average particle diameter ($D_{50}$) of the primary particles is 2 μm or less, since the secondary particle may have appropriate strength while the pores formed in the secondary particle have an appropriate size, the secondary particle may maintain an adequate pore volume by maintaining particle shape even during rolling.

The control of the average particle diameter ($D_{50}$) of the primary particles may be achieved by adjusting an amount of doping metal included in the lithium titanium composite oxide in the preparation process of the primary particles, that is, metal represented by M. Specifically, in the lithium titanium composite oxide represented by Formula 1 or Formula 2, since the average particle diameter ($D_{50}$) of the primary particles is decreased by 0.5% to 2%, for example, 0.7% to 2% when the amount of the M, i.e., an x value is increased by 0.01, the average particle diameter ($D_{50}$) of the primary particles may be controlled by adjusting the amount of the doping metal according to the appropriate average particle diameter ($D_{50}$) of the primary particles. In Formula 1 or Formula 2, x may satisfy $0<x\leq0.5$, particularly $0<x<0.3$, and more particularly $0.002<x<0.05$.

Since the primary particles prepared by the above method are not subjected to a grinding process as a method typically used for the preparation of particles having an appropriate average particle diameter, limitations, in which the strength of the primary particles is decreased due to damage of the primary particles in the grinding process or particle diameters become non-uniform, may be prevented. Thus, in the active material for a lithium secondary battery according to the present invention, since the diameter of the primary particle is controlled according to the amount of the doping metal of the lithium titanium composite oxide included in the primary particle without the separate grinding process for adjusting the particle diameter of the primary particle, the primary particles may have a uniform particle diameter.

An average particle diameter ($D_{90}$) may be 105% to 140% of the average particle diameter ($D_{50}$) while an average particle diameter ($D_{10}$) of the primary particles is 60% to 95% of the average particle diameter ($D_{50}$), particularly, the average particle diameter ($D_{90}$) may be 105% to 135% of the average particle diameter ($D_{50}$) while the average particle diameter ($D_{10}$) of the primary particles is 65% to 95% of the average particle diameter ($D_{50}$), and more particularly, the average particle diameter ($D_{90}$) may be 110% to 130% of the average particle diameter ($D_{50}$) while the average particle diameter ($D_{10}$) of the primary particles is 70% to 90% of the average particle diameter ($D_{50}$).

In a case in which the average particle diameter ($D_{90}$) is 105% to 140% of the average particle diameter ($D_{50}$) while the average particle diameter ($D_{10}$) of the primary particles is 60% to 95% of the average particle diameter ($D_{50}$), since the diameters of the primary particles are uniform throughout, contacts between the primary particles are uniform when the primary particles are agglomerated to form the secondary particle. Thus, the strength of the secondary particle may be increased and the secondary particle may have an adequate pore volume.

In the present specification, the expression "grinding" denotes a process of applying a physical force to reduce a size of a particle or solid having a particle shape to allow it to have a desired particle size, and, for example, is a concept including grinding, cutting, breaking, and polishing.

The secondary particle may have a pore volume of 0.001 $cm^3/g$ to 0.05 $cm^3/g$, for example, 0.005 $cm^3/g$ to 0.02 $cm^3/g$.

The secondary particle may have a specific surface are of 1 $m^2/g$ to 10 $m^2/g$, particularly 3 $m^2/g$ to 7 $m^2/g$, and more particularly 4 $m^2/g$ to 6 $m^2/g$.

The secondary particle may have an average particle diameter ($D_{50}$) of 1 μm to 30 μm, particularly 1 μm to 25 μm, and more particularly 2 μm to 15 μm.

In a case in which the average particle diameter of the secondary particle is 1 μm or more, adequate capacity per volume may be obtained by preventing a decrease in density of an electrode, and, in a case in which the average particle diameter of the secondary particle is 25 μm or less, a slurry for forming the electrode may be properly coated to a uniform thickness.

In the present invention, the average particle diameter ($D_{10}$) may be defined as a particle diameter at 10% in a cumulative particle diameter distribution, the average particle diameter ($D_{50}$) may be defined as a particle diameter at 50% in the cumulative particle diameter distribution, and the average particle diameter ($D_{90}$) may be defined as a particle diameter at 90% in the cumulative particle diameter distribution. The average particle diameter is not particularly limited, but, for example, the average particle diameter may be measured by using a laser diffraction method or a scanning electron microscope (SEM) image. The laser diffraction method may generally measure a particle diameter ranging from a submicron level to a few mm, and may obtain highly repeatable and high resolution results.

When a pressure of 2,000 $kgf/cm^2$ is applied to the secondary particle, the secondary particle may have a pore volume of 70 vol % to 99 vol %, for example, 75 vol % to 90 vol %, based on 100 vol % of the pore volume before applying the pressure.

As described above, even if a predetermined pressure, i.e., a pressure of 2,000 $kgf/cm^2$, is applied to the negative electrode active material for a lithium secondary battery according to the present invention, the volume of the pores included in the secondary particle may not be significantly reduced by the pressure. With respect to the negative electrode active material for a lithium secondary battery according to an exemplary embodiment of the present invention, in a case in which the diameters of the primary particles are uniform throughout and the primary particles are agglomerated to form the secondary particle, since the contacts between the primary particles may be uniform to increase the strength of the secondary particle, the secondary particle may maintain a pore volume of 70 vol % to 99 vol % when the pore volume before applying the pressure is set to 100 vol % even if the pressure of 2,000 $kgf/cm^2$ is applied to the secondary particle.

Thus, in a case in which a layer having a thickness of 10 μm to 100 μm is formed by using the secondary particle and a pressure of 2,000 $kgf/cm^2$ is applied to the layer, since the secondary particle may maintain a pore volume of 70 vol % to 99 vol % based on the pore volume of 0.001 $cm^3/g$ to 0.05 $cm^3/g$ before applying the pressure, an increase in lithium diffusion resistance may be suppressed and excellent rate capability may be achieved.

In the lithium titanium composite oxide represented by Formula 1, M may specifically be K, Rb, Mg, or Ta.

The negative electrode active material for a lithium secondary battery may be prepared by a method of preparing a negative electrode active material for a lithium secondary battery which includes the steps of: (1) solid mixing a lithium-containing compound, a titanium oxide, and a doping metal-containing compound; (2) dispersing the solid mixture of step (1) in a solvent to prepare a slurry; (3) spray drying the slurry prepared in step (2) to prepare a secondary particle formed by agglomeration of primary particles; and (4) sintering the secondary particle formed by the agglomeration of the primary particles, wherein the method does not include a separate grinding process of the solid mixture and the slurry.

In this case, the doping metal may be at least one selected from the group consisting of Na, K, Rb, Zr, W, Mg, Mo, and Ta, and may specifically be at least one selected from the group consisting of K, Rb, Mg, or Ta.

The secondary particle has a pore volume of 0.001 $cm^3/g$ to 0.05 $cm^3/g$.

In step (1), a lithium-containing compound, a titanium oxide, and a doping metal-containing compound are preferentially solid-mixed.

The lithium-containing compound, titanium oxide, and doping metal-containing compound may be solid-mixed according to a stoichiometric ratio for preparing the lithium titanium composite oxide represented by Formula 1 or Formula 2, and may specifically be mixed in amounts such that a molar ratio of lithium, titanium, and doping metal is in a range of 3.7:4.7:greater than 0 to 4:5:0.5.

The lithium-containing compound may be at least one selected from the group consisting of lithium carbonate, lithium hydroxide, and lithium oxide, and the doping metal-containing compound may be at least one selected from the group consisting of carbonate, hydroxide, and oxide of the doping metal.

In the preparation method according to an exemplary embodiment of the present invention, the solid mixing of step (1) may further include a process of adjusting an amount of the doping metal-containing compound according to a desired particle diameter of the primary particles before the solid mixing.

Since the particle diameter of the primary particles formed is reduced as the amount of the doping metal-containing compound is increased, the amount of the doping metal-containing compound may be appropriately adjusted to obtain the desired particle diameter of the primary particles.

Specifically, since the average particle diameter ($D_{50}$) of the primary particles formed is reduced by 0.5% to 2%, for example, 0.7% to 2% when the molar ratio of the doping metal-containing compound among the lithium-containing compound, titanium oxide, and doping metal-containing compound is increased by 0.01, the amount of the doping metal-containing compound may be appropriately adjusted according to the desired particle diameter of the primary particles based on a diameter of primary particles after preparing the primary particles of the lithium titanium composite oxide which does not include the doping metal.

In step (2), the solid mixture obtained in step (1) is dispersed in a solvent to prepare a slurry. The solvent, for example, may be water or an organic solvent, and stirring may be performed in the dispersion process, if necessary.

The slurry obtained in step (2) is spray-dried in step (3) to prepare a secondary particle formed by agglomeration (binding) of the primary particles.

The spraying in step (3) may be performed through a conventional spray device, and, for example, the conventional spray device may include a rotary atomizer, a pressure nozzle, a pneumatic nozzle, and a sonic nozzle, but the present invention is not limited thereto.

The spray drying may be performed in a temperature range of 100° C. to 300° C., and the spraying and drying may be performed through a process of drying by separately heating after spraying, and may be performed through a single process in which the spraying and drying are performed together because the spraying is performed in a temperature range of 100° C. to 300° C.

The method of preparing a negative electrode active material for a lithium secondary battery according to the present invention does not include a separate grinding process of the solid mixture and the slurry in the primary particle formation step.

That is, the method of preparing a negative electrode active material for a lithium secondary battery according to the present invention may prepare the primary particles having a diameter in a desired particle diameter range through a process of adjusting the amount of the doping metal-containing compound without a process of applying a physical force, such as grinding for obtaining the primary particles having a diameter in an appropriate range, and, since the primary particles are not subjected to the process of applying a physical force such as grinding, a decrease in the strength due to the damage of the primary particles or the formation of the primary particles having non-uniform particle diameters may be prevented.

The primary particles formed through the above process may include a lithium titanium composite oxide represented by Formula 1 or Formula 2.

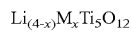

$$Li_{(4-x)}M_xTi_5O_{12} \quad \text{[Formula 1]}$$

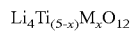

$$Li_4Ti_{(5-x)}M_xO_{12} \quad \text{[Formula 2]}$$

In Formula 1 or Formula 2,

0<x≤0.5, and

M is Na, K, Rb, Zr, W, Mg, Mo, or Ta, and may specifically be K, Rb, Mg, or Ta.

In Formula 1, since an average particle diameter ($D_{50}$) of the primary particles is decreased by 0.5% to 2%, for example, 0.7% to 2% when an x value is increased by 0.01, the diameter of the primary particles may be controlled by adjusting the amount of the doping metal according to the appropriate average particle diameter ($D_{50}$) of the primary particles.

The primary particles thus prepared may have an average particle diameter ($D_{50}$) of 0.05 μm to 2 μm, particularly 0.07 μm to 1 μm, and more particularly 0.1 μm to 0.7 μm.

In a case in which the average particle diameter ($D_{50}$) of the primary particles is 0.05 μm or more, pores formed in the secondary particle in a process of forming the secondary particle by the agglomeration of the primary particles may have an appropriate size, and, in a case in which the average particle diameter ($D_{50}$) of the primary particles is 2 μm or less, since the secondary particle may have appropriate strength while the pores formed in the secondary particle have an appropriate size, the secondary particle may maintain an adequate pore volume by maintaining particle shape even during rolling.

Since the diameter of the primary particle is controlled according to the amount of the doping metal of the lithium titanium composite oxide included in the primary particle without the grinding process, the primary particles may have a uniform particle diameter. An average particle diameter ($D_{90}$) may be 105% to 140% of the average particle diameter ($D_{50}$) while an average particle diameter ($D_{10}$) of the primary particles is 60% to 95% of the average particle diameter ($D_{50}$), particularly, the average particle diameter ($D_{90}$) may be 105% to 135% of the average particle diameter ($D_{50}$) while the average particle diameter ($D_{10}$) of the primary particles is 65% to 95% of the average particle diameter ($D_{50}$), and more particularly, the average particle diameter ($D_{90}$) may be 110% to 130% of the average particle diameter ($D_{50}$) while the average particle diameter ($D_{10}$) of the primary particles is 70% to 90% of the average particle diameter ($D_{50}$).

In a case in which the average particle diameter ($D_{90}$) is 105% to 135% of the average particle diameter ($D_{50}$) while the average particle diameter ($D_{10}$) of the primary particles is 65% to 95% of the average particle diameter ($D_{50}$), since the diameters of the primary particles are uniform throughout, contacts between the primary particles are uniform when the primary particles are agglomerated to form the secondary particle. Thus, the strength of the secondary particle may be increased and the secondary particle may have an adequate pore volume.

In step (4), the primary particles formed in step (3) are sintered to form a secondary particle.

The sintering may be performed by heating the primary particles formed in step (3) at a temperature of 700° C. to 900° C., for example, 700° C. to 800° C., for 30 minutes to 20 hours, for example, 5 hours to 10 hours. The sintering may be performed in an air atmosphere or an inert atmosphere such as nitrogen and argon.

The secondary particle formed may have a pore volume of 0.001 cm$^3$/g to 0.05 cm$^3$/g, for example, 0.005 cm$^3$/g to 0.02 cm$^3$/g.

The secondary particle may have an average particle diameter ($D_{50}$) of 1 μm to 30 μm, particularly 2 μm to 25 μm, and more particularly 5 μm to 20 μm.

In a case in which the average particle diameter of the secondary particle is 1 μm or more, adequate capacity per volume may be obtained by preventing a decrease in density of an electrode, and, in a case in which the average particle diameter of the secondary particle is 30 μm or less, a slurry for forming the electrode may be properly coated to a uniform thickness.

When a pressure of 2,000 kgf/cm$^2$ is applied to the secondary particle, the secondary particle may have a pore volume of 70 vol % to 99 vol %, for example, 75 vol % to 90 vol %, based on 100 vol % of the pore volume before applying the pressure.

Also, in a case in which a layer having a thickness of 10 μm to 100 μm is formed by using the secondary particle and a pressure of 2,000 kgf/cm$^2$ is applied to the layer, since the secondary particle may maintain a pore volume of 70 vol % to 99 vol % based on the pore volume of 0.001 cm$^3$/g to 0.05 cm$^3$/g before applying the pressure, an increase in lithium diffusion resistance may be suppressed and excellent rate capability may be achieved.

The method of preparing a negative electrode active material for a lithium secondary battery may be achieved by applying a method of preparing a lithium titanium composite oxide known in the art except that the method of preparing a negative electrode active material for a lithium secondary battery includes the process of adjusting the amount of the doping metal-containing compound according to the desired particle diameter of the primary particles and does not include the grinding process of the solid mixture and the slurry.

The negative electrode active material for a lithium secondary battery may be used as a negative electrode active material in the preparation of a negative electrode of a lithium secondary battery, and thus, the present invention provides a negative electrode for a lithium secondary battery including the negative electrode active material for a lithium secondary battery.

Furthermore, the present invention provides a lithium secondary battery including the negative electrode for a lithium secondary battery. The lithium secondary battery may include a positive electrode, a negative electrode, and a separator disposed between the positive electrode and the negative electrode.

The positive electrode may be prepared by a typical method known in the art. For example, a binder, a conductive agent, and a dispersant, if necessary, as well as a solvent are mixed with a conventional positive electrode active material and stirred to prepare a slurry, a metal current collector is then coated with the slurry and pressed, and the positive electrode may then be prepared by drying the coated metal current collector.

The metal current collector is a metal with high conductivity, wherein the metal current collector is not particularly limited so long as it, as a metal to which the slurry of the positive electrode active material may be easily adhered, has high conductivity without causing adverse chemical changes in the battery in a voltage range of the battery, and, for example, stainless steel, aluminum, nickel, titanium, fired carbon, or aluminum or stainless steel that is surface-treated with one of carbon, nickel, titanium, silver, or the like may be used. Also, the metal current collector may have a microscopic uneven surface to improve the adhesion of the positive electrode active material. The current collector may be used in various shapes, such as a film, a sheet, a foil, a net, a porous body, a foam body, a non-woven fabric body, and the like, and may have a thickness of 3 μm to 500 μm.

Examples of the positive electrode active material may be lithium cobalt oxide (LiCoO$_2$); lithium nickel oxide (LiNiO$_2$); Li [Ni$_a$Co$_b$Mn$_c$M$^1_d$]O$_2$ (where M$^1$ is at least one element selected from the group consisting of aluminum (Al), gallium (Ga), and indium (In), 0.3≤a<0.1, 0≤b≤0.5, 0≤c≤0.5, 0≤d≤0.1, and a+b+c+d=1); a layered compound, such as Li (Li$_e$M$^2_{f-e-f'}$M$^3_{f'}$)O$_{2-g}$A$_g$ (where 0≤e≤0.2, 0.6≤f≤0≤f'≤0.2, 0≤g≤0.2, M$^2$ includes manganese (Mn) and at least one selected from the group consisting of nickel (Ni), cobalt (Co), iron (Fe), chromium (Cr), vanadium (V), copper (Cu), zinc (Zn), and titanium (Ti), M$^3$ is at least one selected from the group consisting of Al, magnesium (Mg), and boron (B), and A is at least one selected from the group consisting of phosphorous (P), fluorine (F), sulfur (S), and nitrogen (N)), or a compound substituted with at least one transition metal; lithium manganese oxides such as Li$_{1+h}$Mn$_{2-h}$O$_4$ (where 0≤h≤0.33), LiMnO$_3$, LiMn$_2$O$_3$, and LiMnO$_2$; lithium copper oxide (Li$_2$CuO$_2$); vanadium oxides such as LiV$_3$O$_5$, V$_2$O$_5$, and Cu$_2$V$_2$O$_2$; Ni-site type lithium nickel oxide represented by the chemical formula LiNi$_{1-i}$M$^4_i$O$_2$ (where M$^4$=Co, Mn, Al, Cu, Fe, Mg, B, or Ga, and 0.01≤i≤0.3); lithium manganese composite oxide represented by the chemical formula LiMn$_{2-j}$M$^5_j$O$_2$ (where M$^5$=Co, Ni, Fe, Cr, Zn, or Ta, and 0.01≤j≤0.1) or Li$_2$Mn$_3$M$^6$O$_8$ (where M$^6$=Fe, Co, Ni, Cu, or Zn); LiMn$_2$O$_4$ having a part of lithium (Li) being substituted with alkaline earth metal ions; a disulfide compound; LiFe$_3$O$_4$, or Fe$_2$(MoO$_4$)$_3$, but the positive electrode active material is not limited thereto.

An organic solvent, such as N-methylpyrrolidone (NMP), dimethylformamide (DMF), acetone, and dimethylacetamide, or water may be used as the solvent used for forming the positive electrode. These solvents may be used alone or in a mixture of two or more thereof. An amount of the solvent used may be sufficient if the solvent may dissolve and disperse the positive electrode active material, the binder, and the conductive agent in consideration of a coating thickness of the slurry and manufacturing yield.

Various types of binder polymers, such as a polyvinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, poly acrylic acid, and a polymer having hydrogen thereof substituted with Li, Na, or calcium (Ca), or various copolymers, may be used as the binder.

Any conductive agent may be used without particular limitation so long as it has conductivity without causing adverse chemical changes in the battery, and, for example, a conductive material such as: graphite such as natural graphite or artificial graphite; a carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used. The conductive agent may be used in an amount of 1 wt % to 20 wt % based on a total weight of the positive electrode slurry.

An aqueous dispersant or an organic dispersant, such as N-methyl-2-pyrrolidone, may be used as the dispersant.

The negative electrode may be prepared by a typical method known in the art, and, for example, the negative electrode active material for a lithium secondary battery and additives, such as a binder and a conductive agent, are mixed and stirred to prepare a negative electrode active material slurry, and a current collector for a lithium secondary battery may then be coated with the slurry, dried, and pressed to prepare the negative electrode.

In a case in which the negative electrode further includes another negative electrode active material other than the negative electrode active material for a lithium secondary battery, a carbon material typically capable of intercalating and deintercalating lithium ions, lithium metal, silicon, or tin may be used as the additional negative electrode active material. The carbon material may be preferably used, and both low crystalline carbon and high crystalline carbon may be used as the carbon material. Typical examples of the low crystalline carbon may be soft carbon and hard carbon, and typical examples of the high crystalline carbon may be natural graphite, Kish graphite, pyrolytic carbon, mesophase pitch-based carbon fibers, meso-carbon microbeads, mesophase pitches, and high-temperature sintered carbon such as petroleum or coal tar pitch derived cokes.

The binder may be used for maintaining a molded article by binding negative electrode active material particles, wherein the binder is not particularly limited as long as it is a typical binder used in the preparation of the slurry for a negative electrode active material, but, for example, a non-aqueous binder, such as polyvinyl alcohol, carboxymethyl cellulose, hydroxypropylene cellulose, diacetylene cellulose, polyvinyl chloride, polyvinylpyrrolidone, polytetrafluoroethylene (PTFE), polyvinylidene fluoride (PVdF), polyethylene, or polypropylene, may be used, and at least one selected from the group consisting of an acrylonitrile-butadiene rubber, a styrene-butadiene rubber, and an acrylic rubber, which are aqueous binders, or a mixture of two or more thereof may be used. Since the aqueous binder, different from the non-aqueous binder, may be economical and environmentally friendly, may not be harmful to the health of workers, and may have a better binding effect than the non-aqueous binder, a ratio of the active material for the same volume may be increased. Thus, capacity of the lithium secondary battery may be increased, and the styrene-butadiene rubber may be preferably used as the aqueous binder.

The binder may be included in an amount of 10 wt % or less, for example, 0.1 wt % to 10 wt %, based on a total weight of the slurry for a negative electrode active material. When the amount of the binder is less than 0.1 wt %, it is not desirable because an effect obtained by using the binder is insignificant, and, when the amount of the binder is greater than 10 wt %, it is not desirable because capacity per volume may be reduced due to a relative decrease in the amount of the active material caused by the increase in the amount of the binder.

Any conductive agent may be used without particular limitation so long as it has conductivity without causing adverse chemical changes in the battery, and, examples of the conductive agent may be a conductive material such as: graphite such as natural graphite or artificial graphite; a carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives. The conductive agent may be used in an amount of 1 wt % to 9 wt % based on the total weight of the slurry for a negative electrode active material.

A negative electrode collector used in the negative electrode may have a thickness of 3 µm to 500 µm. The negative electrode collector is not particularly limited as long as it has conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, microscopic irregularities may be formed on the surface of the collector to improve the adhesion of the negative electrode active material, and the negative electrode collector may be used in various shapes such as a film, a sheet, a foil, a net, a porous body, a foam body, a non-woven fabric body, and the like.

Furthermore, a typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the separator is not limited thereto.

A lithium salt, which may be included as an electrolyte used in the present invention, may be used without limitation so long as it is typically used in an electrolyte for a lithium secondary battery. For example, any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2$ $(CF_3)_2CO^-$, $(CF_3SO_2)_2CH^-$, $(SF_5)_3C^-$, $(CF_3SO_2)_3C^-$, $CF_3$ $(CF_2)_7SO_3^-$, $CF_3CO_2^-$, $CH_3CO_2^-$, $SCN^-$, and $(CF_3CF_2SO_2)_2N^-$ may be used as an anion of the lithium salt.

The electrolyte used in the present invention may include an organic liquid electrolyte, an inorganic liquid electrolyte, a solid polymer electrolyte, a gel-type polymer electrolyte, a solid inorganic electrolyte, and a molten inorganic electrolyte, which may be used in the preparation of a lithium secondary battery, but the present invention is not limited thereto.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Preferred examples of the medium and large sized device may be an electric vehicle, a hybrid electric vehicle, a plug-in hybrid electric vehicle, or a power storage system, but the medium and large sized device is not limited thereto.

EXAMPLES

Hereinafter, the present invention will be described in detail, according to examples and experimental examples, but the present invention is not limited to these examples and experimental examples. The invention may be embodied in many different forms and should not be construed as being limited to the embodiments set forth herein. Rather, these example embodiments are provided so that this description will be thorough and complete, and will fully convey the scope of the present invention to those skilled in the art.

Example 1: Preparation of Lithium Titanium Composite Oxide

As starting materials, 4.1 moles of lithium hydroxide, 4.9 moles of anatase-type titanium oxide, and 0.1 moles of potassium carbonate were solid mixed and dissolved in water under stirring to prepare a slurry.

The slurry was spray-dried at a hot air temperature of 200° C. and an exhaust hot air temperature of 190° C. and heat-treated at 800° C. for 10 hours in an oxygen atmosphere to prepare a potassium (K)-doped lithium titanium composite oxide having an average particle diameter ($D_{50}$) of primary particles of about 650 nm and an average particle diameter ($D_{50}$) of secondary particles of 6 μm. The lithium titanium composite oxide has a pore volume of 0.018 cm$^3$/g, and a specific surface area measured by a Brunauer-Emmett-Teller (BET) method was 5.2 m$^2$/g. The specific surface area was measured by a 6-point BET method according to a nitrogen gas adsorption-flow method using a porosimetry analyzer (Belsorp-II mini by Bell Japan Inc.).

Example 2: Preparation of Lithium Titanium Composite Oxide

A K-doped lithium titanium composite oxide was prepared in the same manner as in Example 1 except that 0.05 moles of potassium carbonate was used. An average particle diameter ($D_{50}$) of primary particles was about 800 nm, an average particle diameter ($D_{50}$) of secondary particles was 6 μm, and a specific surface area measured by the BET method was 4.5 m$^2$/g.

Example 3: Preparation of Lithium Titanium Composite Oxide

A K-doped lithium titanium composite oxide was prepared in the same manner as in Example 1 except that 0.2 moles of potassium carbonate was used. An average particle diameter ($D_{50}$) of primary particles was about 400 nm, an average particle diameter ($D_{50}$) of secondary particles was 6 μm, and a specific surface area measured by the BET method was 5.8 m$^2$/g.

Comparative Example 1: Preparation of Lithium Titanium Composite Oxide

As starting materials, 4.1 moles of lithium hydroxide and 4.9 moles of anatase-type titanium oxide were solid mixed and dissolved in water under stirring to prepare a slurry, and the slurry was then wet ground at 3,000 rpm using zirconia beads to allow a diameter of primary particles to be in a range of 300 nm to 700 nm.

The slurry was spray-dried at a hot air temperature of 200° C. and an exhaust hot air temperature of 190° C. and heat-treated at 800° C. for 10 hours in an oxygen atmosphere to prepare a lithium titanium composite oxide having an average particle diameter ($D_{50}$) of secondary particles of 6 μm. The lithium titanium composite oxide has a pore volume of 0.006 cm$^3$/g.

Comparative Example 2: Preparation of Lithium Titanium Composite Oxide

As starting materials, 4.1 moles of lithium hydroxide and 4.9 moles of anatase-type titanium oxide were solid mixed and dissolved in water under stirring to prepare a slurry.

The slurry was spray-dried at a hot air temperature of 200° C. and an exhaust hot air temperature of 190° C., was heat-treated at 800° C. for 10 hours in an oxygen atmosphere, and was wet ground at 3,000 rpm using zirconia beads to prepare a K-doped lithium titanium composite oxide having an average particle diameter ($D_{50}$) of secondary particles of 6 μm.

Example 4: Preparation of Negative Electrode 92 wt % of the lithium titanium composite oxide prepared in Example 1, 4 wt % of carbon black as a conductive agent, and 4 wt % of polyvinylidene fluoride (PVdF), as a binder, were added to N-methyl-2-pyrrolidone (NMP), as a solvent, to prepare a negative electrode mixture slurry. An about 20 μm thick aluminum (Al) thin film, as a negative electrode collector, was coated with the prepared negative electrode mixture slurry, dried, and then roll-pressed to prepare a negative electrode on which an active material layer having a porosity of about 33% was formed.

Example 5: Preparation of Negative Electrode

A negative electrode was prepared in the same manner as in Example 4 except that roll press was performed to form an active material layer having a porosity of about 48%.

Comparative Example 3: Preparation of Negative Electrode

A negative electrode was prepared in the same manner as in Example 4 except that the lithium titanium composite oxide prepared in Comparative Example 1 was used instead of the lithium titanium composite oxide prepared in Example 1 during the preparation of the negative electrode.

Comparative Example 4: Preparation of Negative Electrode

A negative electrode was prepared in the same manner as in Comparative Example 3 except that roll press was performed to form an active material layer having a porosity of about 48%.

Example 6: Preparation of Lithium Secondary Battery

<Preparation of Positive Electrode>
96 wt % of a mixture of LiMn$_2$O$_4$ and Li(Ni$_{0.33}$Co$_{0.33}$Mn$_{0.33}$)O$_2$ as a positive electrode active material, 2 wt % of carbon black as a conductive agent, and 2 wt % of polyvinylidene fluoride (PVdF), as a binder, were added to N-methyl-2-pyrrolidone (NMP), as a solvent, to prepare a positive electrode mixture slurry. An about 20 μm thick aluminum (Al) thin film, as a positive electrode collector, was coated with the positive electrode mixture slurry, dried, and then roll-pressed to prepare a positive electrode.
<Preparation of Lithium Secondary Battery>
After a secondary battery was prepared by a conventional method using the prepared positive electrode and the negative electrode prepared in Example 4 with a separator composed of three layers of polypropylene/polyethylene/polypropylene (PP/PE/PP), the preparation of the lithium secondary battery was completed by injecting an electrolyte in which 1 M $LiPF_6$ was dissolved in a solvent that was prepared by mixing ethylene carbonate (EC) and diethyl carbonate (DEC) in a volume ratio of 30:70.

Example 7: Preparation of Lithium Secondary Battery

A lithium secondary battery was prepared in the same manner as in Example 6 except that the negative electrode prepared in Example 5 was used instead of the negative electrode prepared in Example 4 in the preparation of the lithium secondary battery.

Comparative Example 5: Preparation of Lithium Secondary Battery

A lithium secondary battery was prepared in the same manner as in Example 6 except that the negative electrode prepared in Comparative Example 3 was used instead of the negative electrode prepared in Example 4 in the preparation of the lithium secondary battery.

Comparative Example 6: Preparation of Lithium Secondary Battery

A lithium secondary battery was prepared in the same manner as in Example 6 except that the negative electrode prepared in Comparative Example 4 was used instead of the negative electrode prepared in Example 4 in the preparation of the lithium secondary battery.

Experimental Example 1: SEM

Images of the negative electrodes respectively prepared in Examples 4 and 5 and Comparative Examples 3 and 4 were taken using a scanning electron microscope (SEM) and are respectively presented in FIG. 1 (Examples 4 and 5) and 2 (Comparative Examples 3 and 4).

Figure 2:
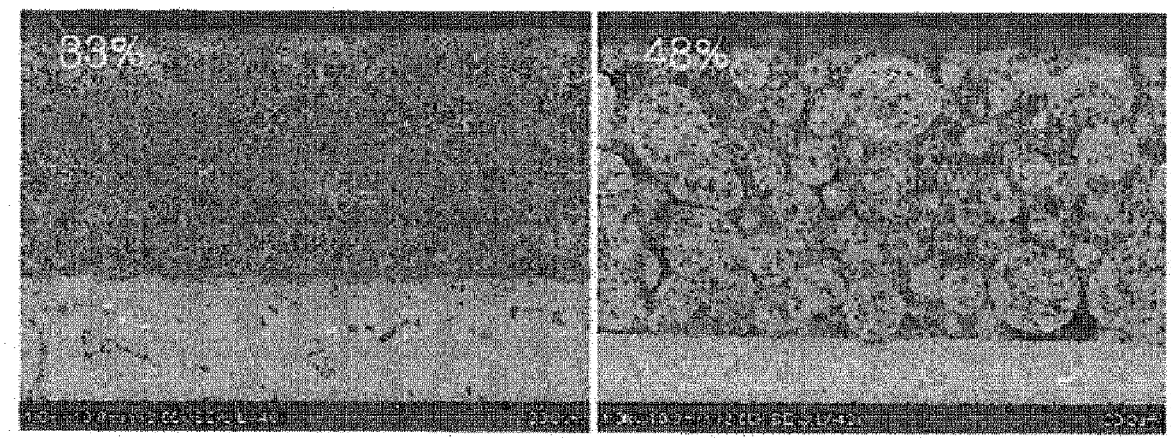
FIG. 2 is SEM images of negative electrodes for a lithium secondary battery respectively prepared in Comparative Examples 3 and 4.

Specifically, the preparation of the negative electrodes was completed by roll pressing the negative electrodes 8 times to allow each active material layer to have a porosity of about 33% and roll pressing the negative electrodes once to allow each active material layer to have a porosity of about 48%, and images of the negative electrodes were taken using an SEM and are respectively presented in FIGS. 1 and 2 (33% and 48% in FIGS. 1 and 2 represent porosities of the negative electrodes).

Referring to FIGS. 1 and 2, it may be confirmed that, with respect to the negative electrode prepared in Example 4, lithium titanium composite oxide particles included in the negative electrode active material layer relatively well maintained their shapes even after the roll pressing in comparison to the negative electrode prepared in Comparative Example 3. This trend was more pronounced in the negative electrode having a porosity of 33%, wherein, with respect to the negative electrode prepared in Comparative Example 3 illustrated in FIG. 2, since the negative electrode active material in a portion, in which the negative electrode active material layer was in contact with the current collector (lower end portion of the negative electrode active material layer in the drawing), was crushed, its shape was not maintained, but, with respect to the negative electrode prepared in Example 4 illustrated in FIG. 1, it may be confirmed that the shape of the negative electrode active material in a portion, in which the negative electrode active material layer was in contact with the current collector, was significantly well maintained in comparison to that of Comparative Example 3.

Experimental Example 2: Particle Size Distribution (PSD) Measurement

PSD of each of the lithium titanium composite oxides prepared in Example 1 and Comparative Example 1 was measured by using 'CILAS 920, France' by CILAS and 'Mastersizer 2000, USA' by MALVERN Instruments Ltd., and is presented in FIG. 3 below.

Figure 3:
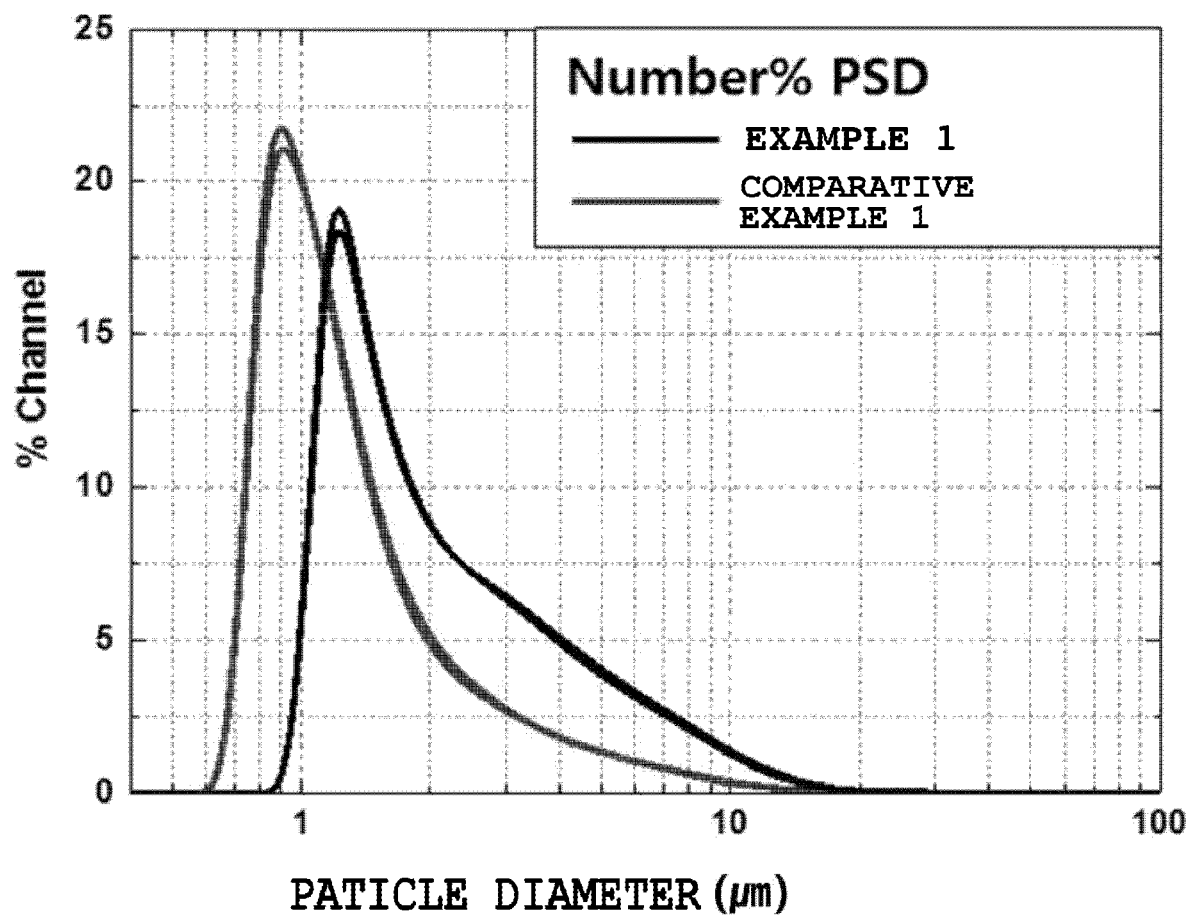
FIG. 3 is the result of measuring a particle size distribution (PSD) of each of lithium titanium composite oxides prepared in Example 1 and Comparative Example 1.

Referring to FIG. 3, it may be confirmed that an amount of particles having a diameter of 1 μm or less of the lithium titanium composite oxide particles prepared in Example 1 was significantly lower and the particle diameter distribution of the particles prepared in Example 1 was narrower than that of the lithium titanium composite oxide particles prepared in Comparative Example 1. These differences were considered due to the fact that, since Comparative Example 1 included the separate grinding process for adjusting the particle diameter of the primary particles, the primary particles may be damaged in this process to reduce the strength or may have non-uniform particle diameters. That is, since the particle diameter distribution of the primary particles in Comparative Example 1 was not uniform, the particle diameter distribution of the secondary particles became wide when the secondary particle was formed by using the primary particles, and thus, it may be considered that an amount of fine particles having a small particle diameter was increased.

Experimental Example 3: Impedance Measurement By EIS

Figure 4:
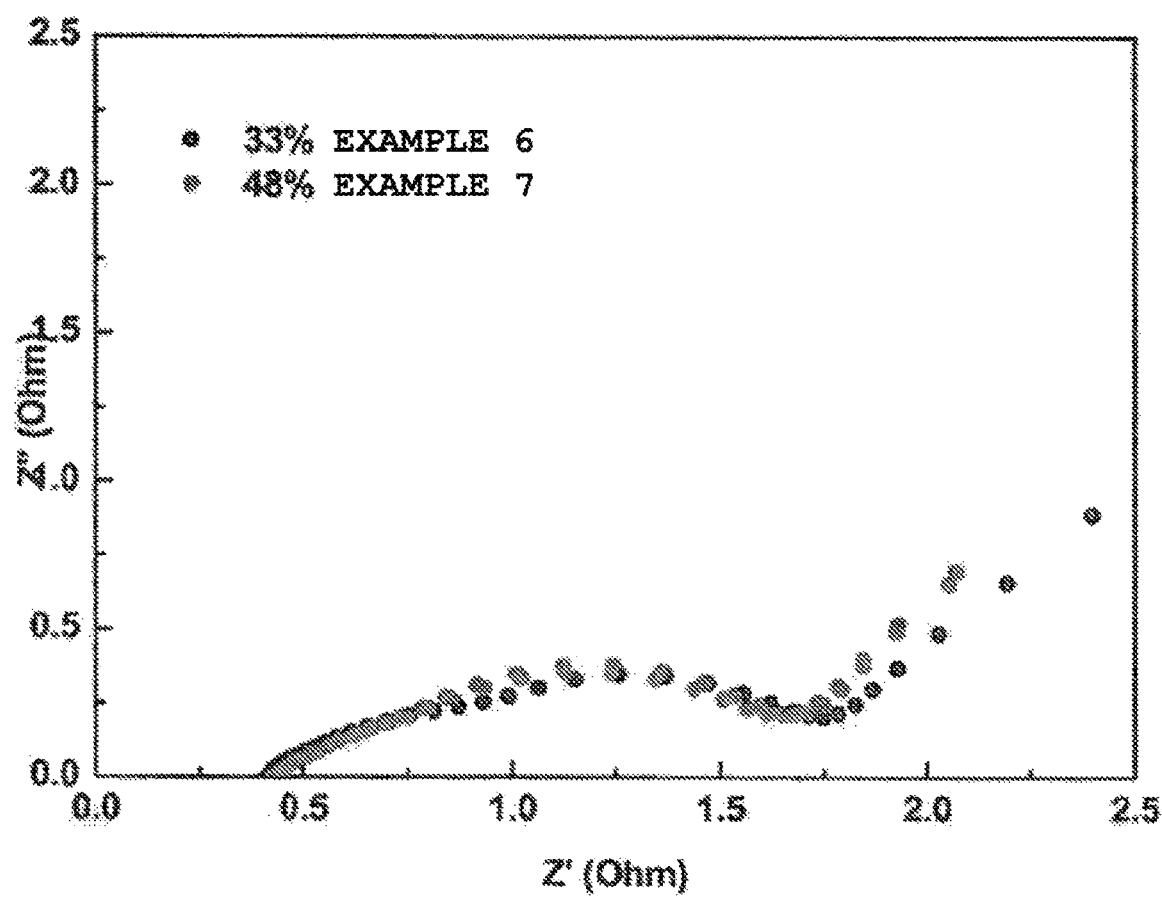
FIG. 4 is a graph illustrating impedances of secondary batteries in which, after the secondary batteries respectively prepared in Examples 6 and 7 are charged and discharged twice, resistance per frequency is measured by using electrochemical impedance spectroscopy (EIS) and its tendency is then converted into a semi-circle.

FIG. 4 (Examples 6 and 7) and 5 (Comparative Examples 5 and 6) illustrate impedances of secondary batteries subjected to two charge/discharge cycles in which resistance per frequency of each secondary battery was measured by using electrochemical impedance spectroscopy (EIS) and its tendency was then converted into a semi-circle.

Figure 5:
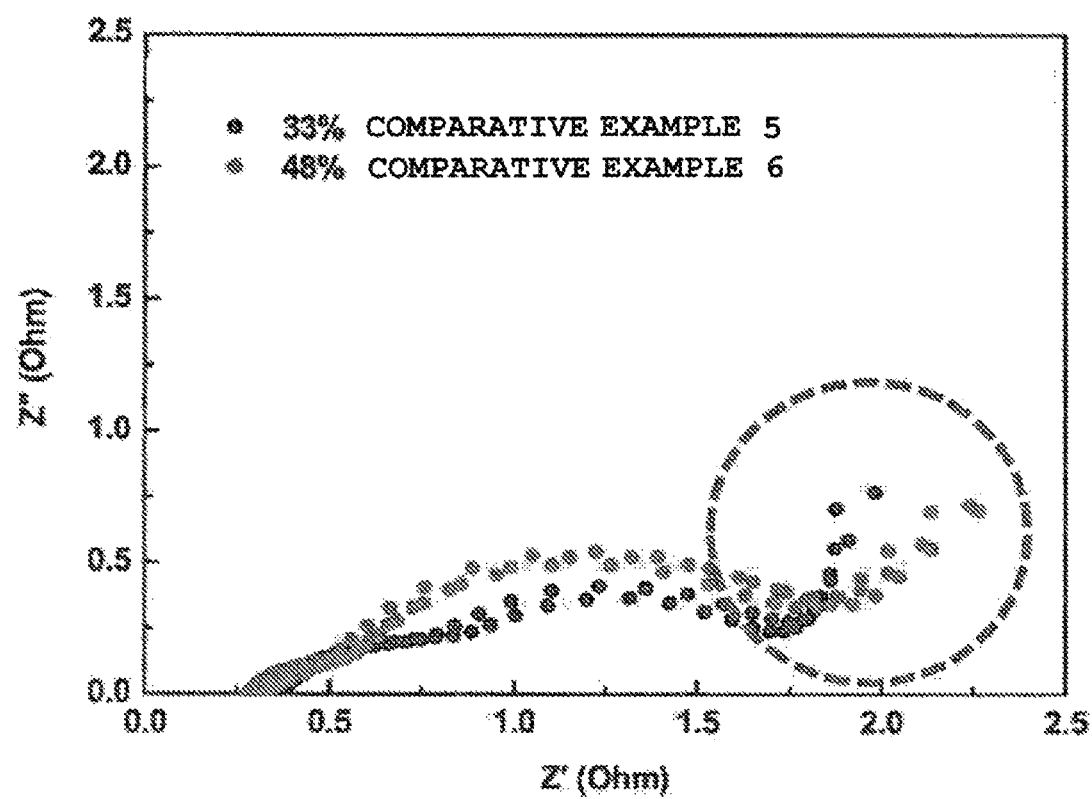
FIG. 5 is a graph illustrating impedances of secondary batteries in which, after the secondary batteries respectively prepared in Comparative Examples 5 and 6 are charged and discharged twice, resistance per frequency is measured by using electrochemical impedance spectroscopy (EIS) and its tendency is then converted into a semi-circle.

Referring to FIGS. 4 and 5, it may be confirmed that, with respect to the negative electrode including the lithium titanium composite oxide of Example 1, resistance at a negative electrode interface was relatively lower than that of the negative electrode including the lithium titanium composite oxide of Comparative Example 1. This was considered due to the fact that, since the lithium titanium composite oxide of Example 1 maintained its particle shape as well as pores of the particle itself even in a case in which the porosity of the active material layer was reduced by roll pressing the negative electrode active material layer, an increase in lithium diffusion resistance was suppressed.

Experimental Example 4: <DC-IR Test>

After the secondary batteries obtained in Example 6 and Comparative Example 5 were charged and discharged twice, the secondary batteries were discharged at 10 C for 3 minutes from a fully charged state to measure voltage drops. The measured results until 30 seconds are illustrated in FIG. 6.

Figure 6:
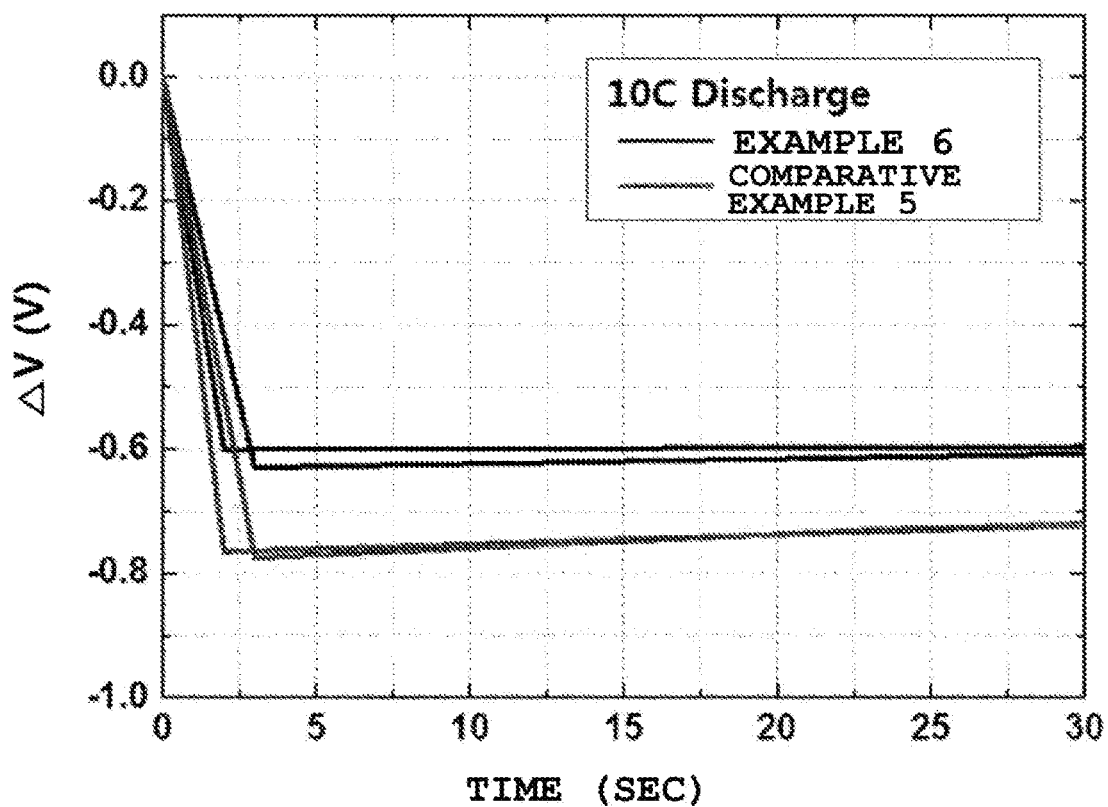
FIG. 6 is a graph illustrating the result of measuring voltage drops when, after secondary batteries respectively prepared in Example 6 and Comparative Example 5 are charged and discharged twice, the secondary batteries are discharged at 10 C for 3 minutes from a fully charged state.

Referring to FIG. 6, the secondary battery of Comparative Example 5 had a larger voltage drop than the secondary battery of Example 6, and it was considered due to the fact that, with respect to the negative electrode (Comparative Example 3) including the lithium titanium composite oxide particles prepared in Comparative Example 1 which was included in the secondary battery of Comparative Example 5, since the amount of fine particles included in the lithium titanium composite oxide particles prepared in Comparative Example 1 was large, the fine particles increased overall resistance of the electrode. In contrast, since the secondary battery of Example 6 included the negative electrode (Example 4) including the lithium titanium composite oxide particles prepared in Example 1 and the lithium titanium composite oxide particles prepared in Example 1 had a uniform particle size distribution, it was considered that an increase in electrode resistance was not relatively large.

Thus, the method of preparing an active material for a lithium secondary battery according to the exemplary embodiment of the present invention may control the diameter of the primary particles by adjusting the amount of the metallic element introduced. Accordingly, the prepared active material for a lithium secondary battery may maintain an adequate pore volume, because it exhibited excellent particle strength while having the adequate pore volume, and may exhibited excellent electrochemical performance due to the uniform particle diameter distribution.

The invention claimed is:

1. An active material for a lithium secondary battery, which comprises a secondary particle formed by agglomeration of primary particles comprising a lithium titanium composite oxide represented by Formula 1 or Formula 2, wherein the secondary particle has a pore volume of 0.001 cm$^3$/g to 0.05 cm$^3$/g:

$$Li_{(4-x)}M_xTi_5O_{12} \quad \text{[Formula 1]}$$

$$Li_4Ti_{(5-x)}M_xO_{12} \quad \text{[Formula 2]}$$

wherein, in Formula 1 or Formula 2,
0<x≤0.5,
M is sodium (Na), potassium (K), rubidium (Rb), zirconium (Zr), tungsten (W), magnesium (Mg), molybdenum (Mo), or tantalum (Ta), and
wherein an average particle diameter ($D_{50}$) of the primary particles is decreased by 0.5% to 2% when x is increased by 0.01.

2. The active material for a lithium secondary battery of claim 1, wherein the primary particles have the average particle diameter ($D_{50}$) of 0.05 μm to 2 μm.

3. The active material for a lithium secondary battery of claim 1, wherein an average particle diameter ($D_{10}$) of the primary particles is 60% to 95% of the average particle diameter ($D_{50}$), and an average particle diameter ($D_{90}$) is 105% to 140% of the average particle diameter ($D_{50}$).

4. The active material for a lithium secondary battery of claim 1, wherein the secondary particle has an average particle diameter ($D_{50}$) of 1 μm to 30 μm.

5. The active material for a lithium secondary battery of claim 1, wherein, when a pressure of 2,000 kgf/cm$^2$ is applied to the secondary particle, the secondary particle has a pore volume of 70 vol % to 99 vol % based on 100 vol % of the pore volume before applying the pressure.

6. The active material for a lithium secondary battery of claim 1, wherein M is K, Rb, Mg, or Ta.

7. An electrode for a lithium secondary battery, the electrode comprising the active material for a lithium secondary battery of claim 1.

8. A lithium secondary battery comprising the electrode for a lithium secondary battery of claim 7.

9. A method of preparing an active material for a lithium secondary battery, the method comprising steps of:
(1) solid mixing a lithium-containing compound, a titanium oxide, and a doping metal-containing compound;
(2) dispersing the solid mixture of step (1) in a solvent to prepare a slurry;
(3) spray drying the slurry prepared in step (2) to prepare a secondary particle formed by agglomeration of primary particles; and
(4) sintering the secondary particle formed by the agglomeration of the primary particles,
wherein the method does not comprise a separate grinding process of the solid mixture the slurry,
the doping metal comprises at least one selected from the group consisting of sodium (Na), potassium (K), rubidium (Rb), zirconium (Zr), tungsten (W), magnesium (Mg), molybdenum (Mo), and tantalum (Ta), and the secondary particle has a pore volume of 0.001 cm$^3$/g to 0.05 cm$^3$/g, and
wherein the solid mixing of step (1) further comprises a process of adjusting an amount of the doping metal-containing compound according to a desired particle diameter of the primary particles before the solid mixing.

10. The method of claim 9, wherein the lithium-containing compound comprises at least one selected from the group consisting of lithium carbonate, lithium hydroxide, and lithium oxide.

11. The method of claim 9, wherein the doping metal-containing compound comprises at least one selected from the group consisting of carbonate, hydroxide, and oxide of the doping metal.

12. The method of claim 11, wherein an average particle diameter ($D_{50}$) of the primary particles formed is reduced by 0.5% to 2% when a molar ratio of the doping metal-containing compound among the lithium-containing compound, titanium oxide, and doping metal-containing compound is increased by 0.01.

13. The method of claim 9, wherein the primary particles comprise a lithium titanium composite oxide represented by Formula 1 or Formula 2:

$$Li_{(4-x)}M_xTi_5O_{12} \quad \text{[Formula 1]}$$

$$Li_4Ti_{(5-x)}M_xO_{12} \quad \text{[Formula 2]}$$

wherein, in Formula 1 or Formula 2,
0<x≤0.5, and
M is Na, K, Rb, Zr, W, Mg, Mo, or Ta.

14. The method of claim 13, wherein an average particle diameter ($D_{50}$) of the primary particles is reduced by 0.5% to 2% when an x value in Formula 1 or Formula 2 is increased by 0.01.

15. The method of claim 9, wherein an average particle diameter ($D_{10}$) of the primary particles is 60% to 95% of an average particle diameter ($D_{50}$), and an average particle diameter ($D_9O$) is 105% to 140% of the average particle diameter ($D_{50}$).

* * * * *